3,391,182
PREPARATION OF DIALKYL 2-DIALKOXY-METHYL MALONATES
Robert A. Grimm, Savage, Minn., assignor to Ashland Oil & Refining Company, Ashland, Ky., a corporation of Kentucky
No Drawing. Filed Jan. 27, 1966, Ser. No. 523,282
3 Claims. (Cl. 260—484)

This invention relates to the preparation of dialkyl 2-dialkoxymethyl malonates. In another aspect, it relates to such malonates as new componds. In a further aspect, it relates to diethyl 2-ethoxymethyl malonate as a new compound and to the preparation thereof.

Briefly, I have discovered a new class of compounds having the general formula $(ROOC)_2CHCH(OR)_2$, where R is an alkyl group generally having 1 to 18 carbon atoms, and preferably a lower alkyl group having 1 to 8 carbon atoms. These new compounds are prepared by reacting carbon suboxide, $C_3O_2$, with an alkyl orthoformate, $HC(OR)_3$ (where R is as defined above), in the presence of an acidic catalyst. In a preferred embodiment, diethyl 2-diethoxymethyl malonate is prepared by reacting carbon suboxide with triethylorthoformate in the presence of a catalytic amount of zinc chloride. These new compounds are useful as monomers for the preparation of polyester resins used in film-forming coatings and as chemical intermediates for organic syntheses.

In carrying out the reaction of the carbon suboxide with the alkylorthoformate, at least one molar equivalent of the orthoformate is used per mole of the carbon suboxide; preferably, the orthoformate is used in an amount of up to 50% excess of said molar equivalent. The carbon suboxide can be prepared by a variety of methods, though I prefer to prepare it by pyrolyzing diacetyl tartaric anhydride, condensing the resulting generated vaporous carbon suboxide and maintaining it in its liquid state prior to use by keeping it below its boiling point (7°). In subsequently carrying out the reaction of this invention, I prefer then to distill the liquid carbon suboxide over into the reaction vessel wherein it comes into contact with the alkylorthoformate-catalyst mixture previously charged to such vessel and cooled to a temperature in the range of —80° C. to 0° C., preferably —25° C. to 0° C., which temperature is maintained as the carbon suboxide is charged. The ensuing reaction is exothermic and can be carried out in the range of 0° C. to 50° C., preferably 0° C. to 25° C.

In the preferred manner of carrying out the reaction, sufficient trialkylorthoformate is used to serve as a reaction solvent. Alternatively, inert solvents can be used, such as ethyl ether, benzene, xylene, tetrahydrofuran, and the like.

The catalyst and alkylorthoformate are preferably charged to the reaction vessel prior to charging the carbon suboxide. The amount of catalyst used, functionally expressed, is a catalytic amount; this amount will be dependent upon the solubility of the catalyst in the orthoformate or solvent, but generally will be in the range of 0.1 to 5% by weight based on the weight of the orthoformate charged. Any Lewis acid catalyst can be used, such as zinc chloride, boron trifluoride, mercuric chloride, anhydrous ferric chloride, aluminum chloride, and the like. I prefer to use zinc chloride, which has limited solubility in the alkylorthoformate, and saturated the orthoformate with the zinc chloride when the orthoformate is used as a solvent to ensure solution of a catalytic amount of the zinc chloride.

After the exothermic reaction has subsided, the reaction mixture can stand for one or several hours, and the dialkyl 2-dialkoxymethyl malonate recovered therefrom. Recovery can be effected by first neutralizing or destroying the acid catalyst by adding to the reaction mixture a base dissolved or suspended in alcohol to render it alkaline. Bases which can be used include potassium hydroxide, calcium hydroxide, magnesium hydroxide, sodium hydroxide, sodium bicarbonate, sodium carbonate, and the like. Suitable alcohols which can be used with the base are those having 1 to 18, preferably 1 to 8, carbon atoms per molecule. The malonate product can then be distilled from the alkaline reaction mixture or extracted with a solvent such as ethyl ether, benzene, carbon tetrachloride, hexane, or the like, and the product recovered from the extract by evaporation or distillation of the solvent.

Alkylorthoformates which can be used according to this invention to prepare the malonate products representatively include methylorthoformate, ethylorthoformate, propylorthoformate, butylorthoformate, pentylorthoformate, hexylorthoformate, heptylorthoformate, octylorthoformate, decylorthoformate, dodecylorthoformate, tetradecylorthoformate, hexadecylorthoformate, octodecylorthoformate, and the like, as well as mixed orthoformates.

The dialkyl 2-dialkoxymethyl malonates prepared according to this invention representatively include dimethyl 2-dimethoxymethyl malonate, diethyl 2-diethoxymethyl malonate, dipropyl 2-dipropoxymethyl malonate, dibutyl 2-dibutoxymethyl malonate, dipentyl 2-dipentoxymethyl malonate, dihexyl 2-dihexoxymethyl malonate, diheptyl 2-diheptoxymethyl malonate, dioctyl 2 - dioctoxymethyl malonate, didecyl 2-didecoxymethyl malonate, didodecyl 2-didodecoxymethyl malonate, ditetradecyl 2-ditetradecoxymethyl malonate, dihexadecyl 2-dehexadecoxymethyl malonate, dioctodecyl 2 - dioctodecoxymethyl malonate, and the like.

The following example further illustrates the objects and advantages of this invention, but it should be understood that the particular reactants, conditions of reaction, and other details of this example, should not be construed to unduly limit this invention.

EXAMPLE

Diethyl 2-diethoxymethyl malonate was prepared according to this invention in the following manner.

Triethylorthoformate (1.35 moles) was mixed with dry zinc chloride (0.07 mole)—the zinc chloride partially dissolving to provide a catalytic amount of zinc chloride—and the mixture was cooled in a Dry Ice bath. Carbon suboxide (0.82 mole), prepared by pyrolysis of diacetyl tartaric anhydride, was distilled over into the reaction flask. After the carbon suboxide was completely charged, the flask was tightly stoppered and the reaction mixture agitated. The ensuing exothermic reaction was allowed to warm the reaction mixture up to room temperature. After the reaction was complete, the reaction mixture was made alkaline by adding a 10% solution of potassium hydroxide in ethanol and the reaction mixture was admixed with ether. The ether solution was washed four times with water, dried over sodium sulfate and concentrated by evaporating the ether. The characterization of the resulting product as diethyl 2-diethoxymethyl malonate was confirmed by nuclear magnetic resonance, molecular weight determination, infrared spectrum analysis, molar refraction analysis, and elemental analysis. It was stable when subjected to vacuum distillation and had a boiling point of 70° C. at 50 microns.

Various modifications and alterations of this invention will become apparent to those skilled in the art without departing from the scope and spirit of this invention, and

I claim:

1. The process comprising reacting carbon suboxide with an alkylorthoformate in the presence of a Lewis acid catalyst and recovering the resulting dialkyl 2-dialkoxymethyl malonate from the reaction mixture as the product of the process.

2. The process according to claim 1, wherein said alkylorthoformate is triethylorthoformate.

3. The process according to claim 1, wherein said Lewis acid catalyst is zinc chloride.

References Cited

UNITED STATES PATENTS 2,716,660    8/1955    Patrick _____ 260—484

OTHER REFERENCES

Dashkevich: Chem. Ab., vol. 54: 20,872i (1960).
Dashkevich: Chem. Ab., vol. 62: 13,037h (May 1965).
Fuson et al.: Chem. Ab., vol. 40: 3,403 (1946), citing J. Org. Chem., vol. 11, pp. 194–198 (1946).

LORRAINE A. WEINBERGER, *Primary Examiner.*

A. P. HALLUIN, *Assistant Examiner.*